United States Patent
Menon et al.

(10) Patent No.: US 9,537,900 B2
(45) Date of Patent: Jan. 3, 2017

(54) SYSTEMS AND METHODS FOR SERVING APPLICATION SPECIFIC POLICIES BASED ON DYNAMIC CONTEXT

(71) Applicant: Avaya Inc., Basking Ridge, NJ (US)

(72) Inventors: Sunil Menon, Los Gatos, CA (US); Shailesh Patel, San Jose, CA (US)

(73) Assignee: Avaya Inc., Santa Clara, CA (US)

(*) Notice: Subject to any disclaimer, the term of this patent is extended or adjusted under 35 U.S.C. 154(b) by 0 days.

(21) Appl. No.: 14/286,996

(22) Filed: May 24, 2014

(65) Prior Publication Data

US 2015/0341391 A1 Nov. 26, 2015

(51) Int. Cl.
*G06F 15/16* (2006.01)
*H04L 29/06* (2006.01)
*H04L 29/08* (2006.01)

(52) U.S. Cl.
CPC .......... *H04L 63/205* (2013.01); *H04L 29/06* (2013.01); *H04L 63/08* (2013.01); *H04L 67/22* (2013.01); *H04L 67/303* (2013.01); *H04L 67/42* (2013.01)

(58) Field of Classification Search
CPC ........ H04L 63/10; H04L 63/20; H04L 63/205; H04L 63/08; H04L 29/06; H04L 67/22; H04L 67/303; H04L 67/42
See application file for complete search history.

(56) References Cited

U.S. PATENT DOCUMENTS

| | | | |
|---|---|---|---|
| 6,910,074 B1* | 6/2005 | Amin | H04L 12/2856 709/227 |
| 7,603,657 B2* | 10/2009 | Gassner | G06F 9/06 717/113 |
| 7,620,708 B2* | 11/2009 | Andreasen | 709/223 |
| 8,032,623 B2* | 10/2011 | Colby et al. | 709/223 |
| 8,341,717 B1* | 12/2012 | Delker et al. | 726/10 |
| 8,893,218 B2* | 11/2014 | De Armas et al. | 726/1 |
| 9,288,235 B1* | 3/2016 | Hou | H04L 63/20 |
| 2002/0002577 A1* | 1/2002 | Garg | G06F 9/4428 718/104 |
| 2009/0158425 A1* | 6/2009 | Chan | G06F 21/60 726/21 |
| 2013/0054960 A1* | 2/2013 | Grab | G06F 21/10 713/155 |
| 2014/0096215 A1* | 4/2014 | Hessler | H04L 63/0869 726/7 |
| 2015/0050922 A1* | 2/2015 | Ramalingam | H04W 12/08 455/418 |

\* cited by examiner

*Primary Examiner* — Jung Kim
*Assistant Examiner* — James J Wilcox

(57) ABSTRACT

Methods, systems and computer readable media for serving application specific policies based on dynamic context are described. In some implementations, the method can include determining a dynamic authentication context for a user including one or more access credentials, and authenticating the access credentials. The method can also include determining an indication of a need for a service-based policy, and generating a dynamic service-based policy based on the dynamic authentication context and an application. The method can further include providing the dynamic service-based policy to the application, and monitoring for a change in the dynamic authentication context. The method can also include updating the dynamic service-based policy.

9 Claims, 3 Drawing Sheets

SYSTEMS AND METHODS FOR SERVING APPLICATION SPECIFIC POLICIES BASED ON DYNAMIC CONTEXT

TECHNICAL FIELD

Embodiments relate generally to computer networks, and more particularly, to methods, systems and computer readable media for serving application specific policies based on dynamic context.

BACKGROUND

Increasingly, users access corporate networks and applications using multiple different devices and may have multiple user profile types (e.g. employee, guest, mobile, etc.). Because of the diversity of devices and profiles present, a network may benefit from granular control over what users can or cannot access depending on a dynamic context of their access. Existing systems for application access and provisioning of resources (e.g. network resources, applications, etc.) may not provide mechanisms to enforce fine grain policy enforcement based on dynamic context.

Embodiments were conceived in light of the above mentioned needs, problems and/or limitations, among other things.

SUMMARY

One or more embodiments can include methods, systems and computer readable media for serving application specific policies based on dynamic context. In some implementations, the method can include determining, at one or more processors, a dynamic authentication context for a user including one or more access credentials, and authenticating, at the one or more processors, the access credentials. The method can also include determining, at the one or more processors, an indication of a need for a service-based policy, and generating, at the one or more processors, a dynamic service-based policy based on the dynamic authentication context and an application. The method can further include providing, at the one or more processors, the dynamic service-based policy to the application, and monitoring, at the one or more processors, for a change in the dynamic authentication context. The method can also include updating, at the one or more processors, the dynamic service-based policy.

Some implementations can include a system comprising one or more processors configured to perform operations. The operations can include determining a dynamic authentication context for a user including one or more access credentials, and authenticating the access credentials. The operations can also include determining an indication of a need for a service-based policy, and generating a dynamic service-based policy based on the dynamic authentication context and an application. The operations can further include providing the dynamic service-based policy to the application, and monitoring for a change in the dynamic authentication context. The operations can also include updating the dynamic service-based policy.

Some implementations can include a nontransitory computer readable medium having stored thereon software instructions that, when executed by a processor of a wireless controller, cause the processor to perform operations. The operations can include determining a dynamic authentication context for a user including one or more access credentials, and authenticating the access credentials. The operations can also include determining an indication of a need for a service-based policy, and generating a dynamic service-based policy based on the dynamic authentication context and an application. The operations can further include providing the dynamic service-based policy to the application, and monitoring for a change in the dynamic authentication context. The operations can also include updating the dynamic service-based policy.

In any of the implementations described above, the dynamic authentication context can include at least one of a device type, a device capability, a network and an access location. The indication of a need for a service-based policy can include determining the user is seeking to access the application.

The indication of a need for a service-based policy can include determining the application is requesting the service-based policy. The method can further include providing the updated dynamic service-based policy to the application without a request from the application for an updated dynamic service-based policy.

The change in the dynamic authentication context can include a change in one or more of a device type, a device capability, a network and an access location.

DETAILED DESCRIPTION

Figure 1:
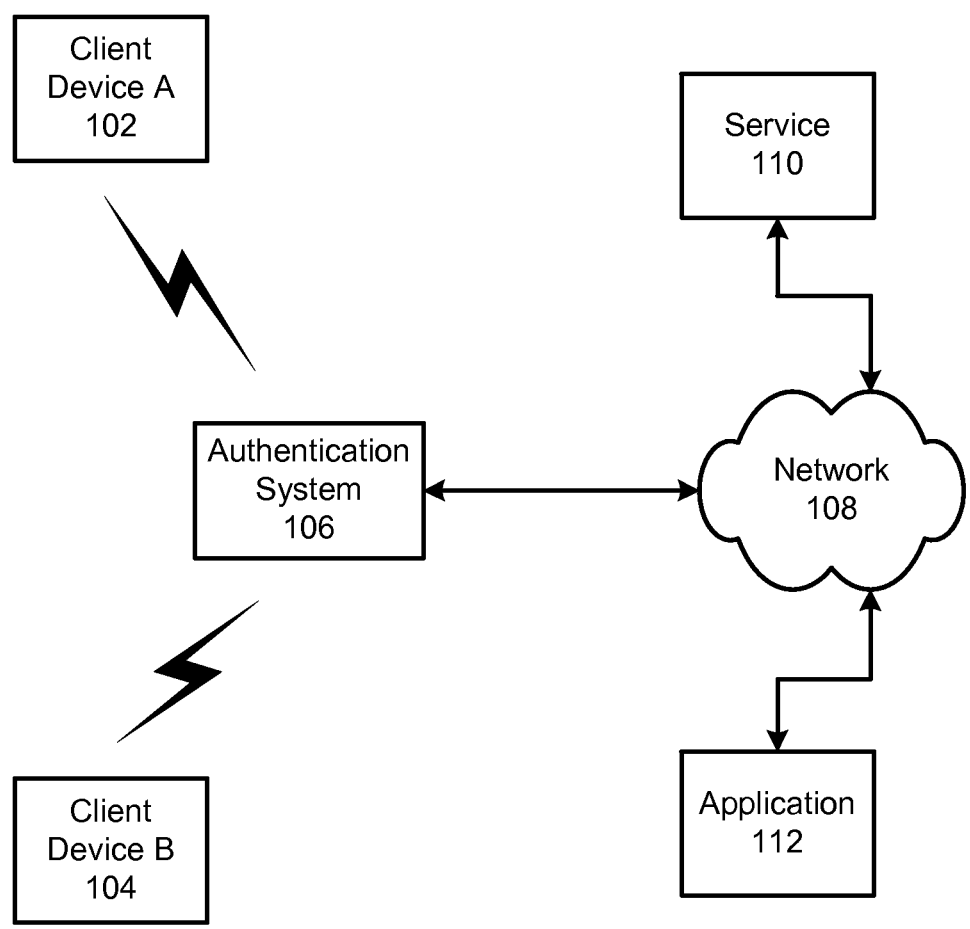
FIG. 1 is a diagram of an example network in accordance with at least one implementation.

In general, some implementations can determine a dynamic context profile for a user that can include information such as user identification, device type, network and location (e.g., device location, access point location or the like) information. In addition to providing access control, some implementations can also determine run-time enforcement policies based on the authentication context for a specific application service.

As users access the enterprise network from a variety of devices the capabilities of those devices along with the access credentials (and other context information) can be received by an authentication system (such as an Identity Engine by Avaya, Inc. of Basking Ridge, N.J.). Subsequently as the user tries to use a specific enterprise application, an implementation can present an "application normalized" view of the capabilities of the user/device to the application so that the application can make an intelligent choice of features that will be delivered to the user as part of the application session based on the dynamic context. Thus, applications may be relieved of the burden of handling a varied set of capability expressions from various types of user devices.

Some implementations can determine the dynamic context profile and send fine grained enforcement policies to applications which can be used by the applications to set parameters and access levels commensurate with the device and/or user context. For instance, if a user uses a personal tablet to log into the network, an implementation can create a unique user profile with a specific context. The context can change dynamically, such as if the user first accesses the network from a corporate location and then moves off-site to a non-corporate controlled location (e.g., home, restaurant, airport, customer location or the like).

Some implementations can allow the enterprise to create application specific policies using the contextual information. An authentication system implementation can intercept the user's access to the application, performs authentication/authorization and generate the policy (using, for example, XACML, a standard policy language) that the application must (or should) enforce based on the contextual information. This policy can be delivered to the application inline as a part of authorization response, in response to an application query for a policy out-of-band, and/or may be "pushed" by the authentication system to an application (e.g., based on a context change detected by the authentication system).

This can permit the authentication system to provide insight into the current user context as well as into policies (e.g., an Enterprise policy) that can consume user and application attributes to various applications.

These features can permit applications and services to make real-time (or near real-time) decisions and dynamically act based on how the user attempts to access the service or an application. Access can then be granted to resources based on the relevant content in the enforcement policies. This also allows creation of a centralized policy decision point that can effectively distribute dynamic policies to services and applications. The enforcement policies could be provided to these enforcement points dynamically by the authentication system implementation as a response to an authentication request. Unlike some currently prevalent practices in which policies are statically defined and neither utilize user context nor can be adjusted dynamically based on changes in the user context.

The authentication system (e.g., Identity Engine), as part of authentication response, can provide applications and services with granular enforcement policies based on user profile/context. For example, a collaboration service with video and voice can provide video and voice access for a user accessing the service using an enterprise network with a laptop. However, if the user moves to a personal mobile device, the same service may only grant voice access. This dynamic resource allocation is made on-demand by the service using the dynamic context and enforcement policies made available to the service by the authentication system.

FIG. 1 is a diagram of an example network environment 100 in accordance with at least one implementation. The network 100 includes a first client device 102, a second client device 104, an authentication system 106, a network 108, a service 110 and an application 112. It will be appreciated that the configured shown in FIG. 1 is for explanation purposes and there could be more or less client devices, authentication systems, services and applications.

In operation, a user using a client device (e.g., 102 or 104) seeks to access the network 108 and/or service 110 or application 112. Prior to gaining access to the full network, the user must be authenticated by the authentication system 106 (e.g., Avaya Identity Engine). In order to be authenticated, the client device is permitted to connect to the authentication server so the user can supply authentication credentials (e.g., username, password and the like). In addition to the credential information, the authentication system may also collect other dynamic context information including one or more of device type, device capabilities/limitations, network and location (e.g., device location, access point location or the like) information. It will be appreciated that network environment 100 is shown without some common elements for the sake of clarity. For example, there may be one or more wireless access points that serve as an interface between wireless devices and the enterprise network.

Once the authentication credentials are verified, the authentication system 106 can create a dynamic authentication context and one or more policies based on the dynamic authentication context. The policies can be service-based and/or application-based policies that provide the dynamic authentication context information in a format that is consumable by a service or application as input data.

When one or more authentication context parameters change (e.g., user switches devices, user moves to a different access location or the like), the authentication system 106 can detect the change and update the dynamic authentication context to reflect the change. The updated dynamic authentication context information can then be used to create updated service and/or application-based policies. The updated policies can be provided to a service or application upon request or can be "pushed" (or sent without request) to the services and/or applications that the user is connected to.

Figure 2:
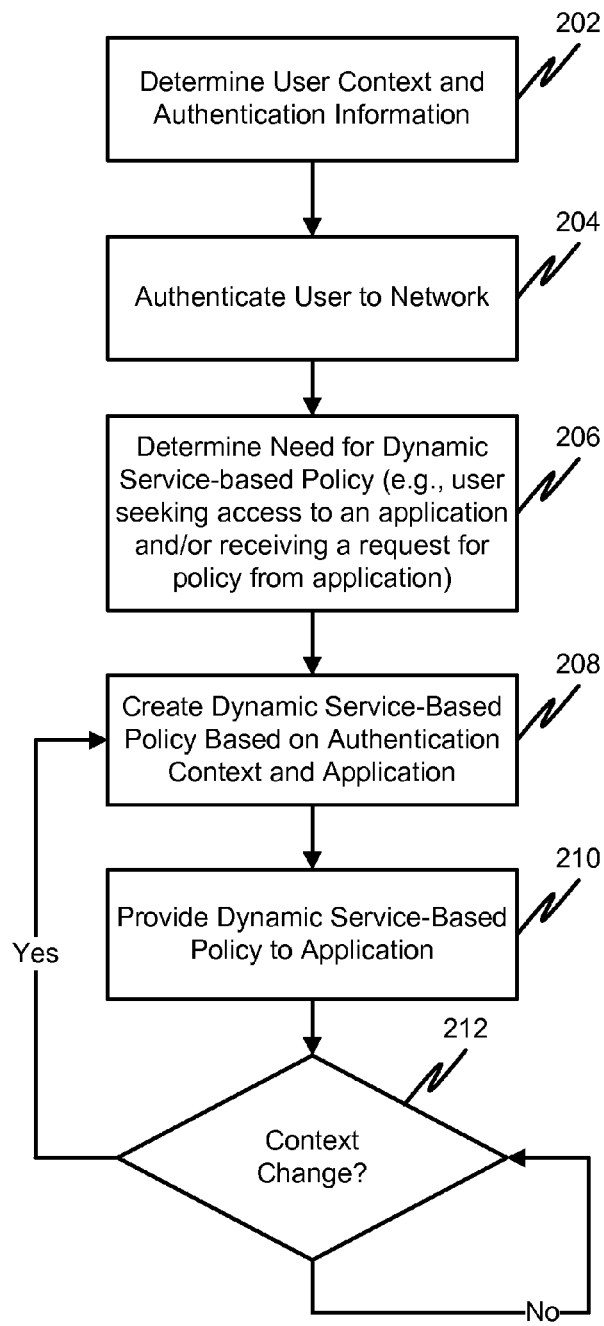
FIG. 2 is a flow chart of an example method for serving application specific policies based on dynamic context in accordance with at least one implementation.

FIG. 2 is a flow chart of an example method for serving application specific policies based on dynamic context in accordance with at least one implementation. Processing begins at 202, where user context and authentication information are determined. For example, as discussed above, when a user is attempting to access a network via a client device (e.g., 102 or 104) and supplies authentication credentials to an authentication system (e.g., 106). The authentication system can determine the authentication credentials and a dynamic authentication context for the user as discussed above. Processing continues to 204.

At 204, the authentication system (or other suitable system) can validate the access (or authentication) credentials supplied by the user. Processing continues to 206 (if the supplied credentials are valid).

At 206, the authentication system (or other suitable system) can determine a need for one or more service or application-based policies. The need for a service or application-based policy can be determined, for example, based on the user seeking access to a service and/or application or by receiving, at the authentication system, a request for a service or application-based policy. Processing continues to 208.

At 208, a dynamic service-based (or application-based) policy is created based on the dynamic authentication context of the user. The policy can be configured to supply information to the service and/or application in a format that is consumable by the service or application as input and which provides the information needed by the service or application to determine a level of access and/or other provision parameter(s) (e.g., bandwidth). Processing continues to 210.

At 210, the dynamic service or application based-policy is provided to the corresponding service or application. Processing continues to 212.

At 212, the authentication determines whether one or more dynamic authentication context values have changed. If so, processing continues to 208. If not, the system continues to periodically (or continuously) monitor for context changes.

It will be appreciated that 202-212 can be repeated in whole or in part in order to accomplish a contemplated dynamic authentication context policy task.

Figure 3:
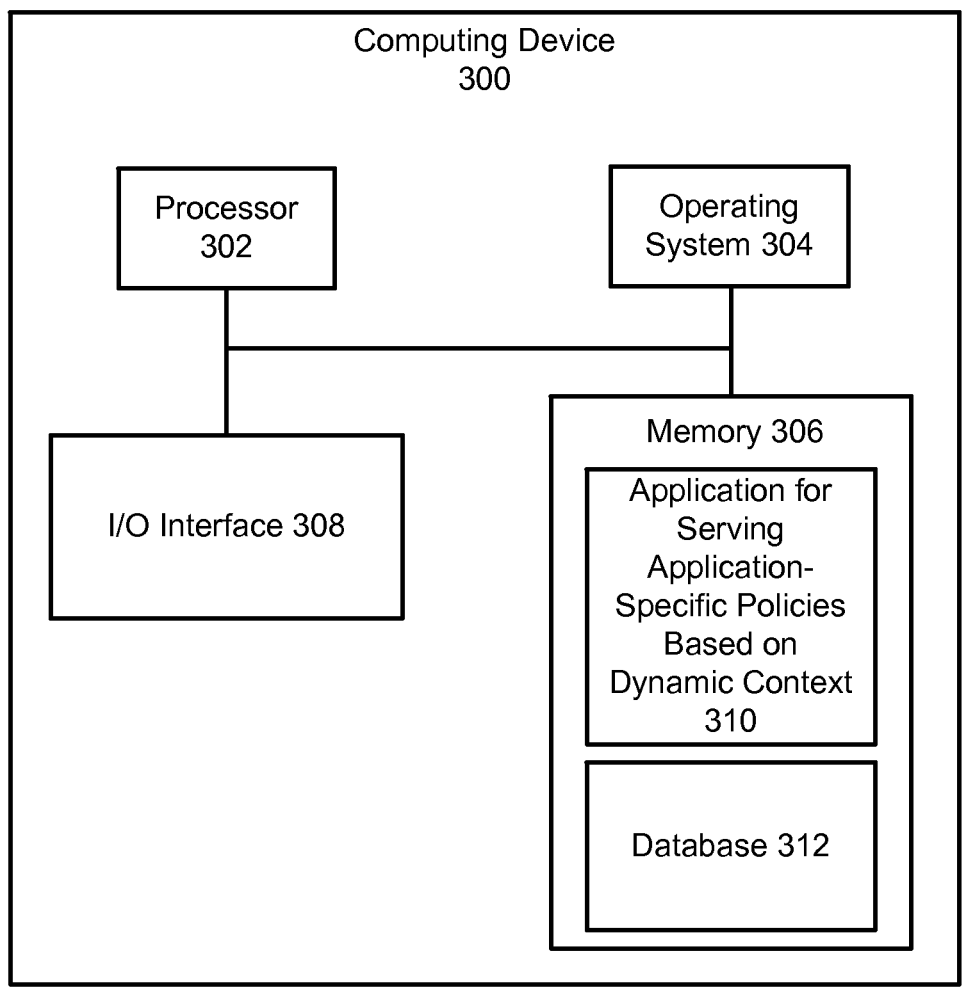
FIG. 3 is a diagram of an example computer system for serving application specific policies based on dynamic context in accordance with at least one implementation.

FIG. 3 is a diagram of an example computer system 300 (e.g., an authentication or access control system in a network or the like) in accordance with at least one implementation. The computer 300 includes a processor 302, operating system 304, memory 306 and I/O interface 308. The memory 306 can include an application configured to serve application specific policies based on dynamic context 310 and a database 312 (e.g., for storing dynamic context information, access policies or the like).

In operation, the processor 302 may execute the application 310 stored in the memory 306. The application 310 can include software instructions that, when executed by the processor, cause the processor to perform operations for serving application specific policies based on dynamic context in accordance with the present disclosure (e.g., performing one or more of steps 202-212).

The application program 310 can operate in conjunction with the database 312 and the operating system 304.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for serving application specific policies based on dynamic context.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   intercepting, at one or more processors of an authentication system, an attempt by a user device to access an application served remotely from the user device;
   determining, at the one or more processors of the authentication system, a dynamic authentication context for the user device including one or more access credentials, wherein the dynamic authentication context includes a device capability;
   authenticating, at the one or more processors of the authentication system, the access credentials;
   determining, at the one or more processors of the authentication system, an indication of a need for a service-based policy, wherein the indication of a need for a service-based policy includes determining the user device is seeking to access the application served remotely from the user device;

generating, at the one or more processors of the authentication system, a dynamic service-based policy based on the dynamic authentication context and an application, wherein the dynamic service-based policy includes an application normalized view of the device capability;

providing, at the one or more processors of the authentication system, the dynamic service-based policy to the application, including the application normalized view of the device capability;

determining, at the application, one or more features to be delivered from the remotely served application to the user device as part of an application session based on the dynamic authentication context and the application normalized view of the device capability;

monitoring, at the one or more processors of the authentication system, for a change in the dynamic authentication context, wherein the change in the dynamic authentication context includes a change in the device capability;

updating, at the one or more processors, the dynamic service-based policy to generate an updated dynamic service-based policy; and providing the updated dynamic service-based policy to the application without a request from the application for an updated dynamic service-based policy.

2. The method of claim 1, wherein the dynamic authentication context further includes a device type.

3. The method of claim 1, wherein the indication of a need for a service-based policy includes determining the application is requesting the service-based policy.

4. A system comprising:
a computer having one or more processors; and
a computer readable storage having stored therein software instructions that, when executed by the one or more processors, cause the processors to:
intercept an attempt by a user device to access an application served remotely from the user device;
determine a dynamic authentication context for the user device including one or more access credentials, wherein the dynamic authentication context includes at least one of a device capability, a network and an access location;
authenticate the access credentials;
determine an indication of a need for a service-based policy, wherein the indication of a need for a service-based policy includes determining the user device is seeking to access the application served remotely from the user device;
generate a dynamic service-based policy based on the dynamic authentication context and an application, wherein the dynamic service-based policy includes an application normalized view of the device capability;
provide the dynamic service-based policy from an authentication system to the application, including the application normalized view of the device capability;
determine, at the application, one or more features to be delivered from the remotely served application to the user device as part of an application session based on the dynamic authentication context and the application normalized view of the device capability;
monitor, at the authentication system, for a change in the dynamic authentication context, wherein the change in the dynamic authentication context includes a change in the device capability;
update, at the authentication system, the dynamic service-based policy to generate an updated dynamic service-based policy; and
provide the updated dynamic service-based policy to the application from the authentication system without a request from the application for an updated dynamic service-based policy.

5. The system of claim 4, wherein the dynamic authentication context includes a device type.

6. The system of claim 4, wherein the indication of a need for a service-based policy includes determining the application is requesting the service-based policy.

7. A nontransitory computer readable medium having stored thereon software instructions that, when executed by a processor of a wireless controller, cause the processor to perform operations including:
intercepting, at an authentication system, an attempt by a user device to access an application served remotely from the user device;
determining, at the authentication system, a dynamic authentication context for the user device including one or more access credentials, wherein the dynamic authentication context includes at least one of a device capability, a network and an access location;
authenticating the access credentials;
determining an indication of a need for a service-based policy, wherein the indication of a need for a service-based policy includes determining the user device is seeking to access the application served remotely from the user device;
generating a dynamic service-based policy based on the dynamic authentication context and an application, wherein the dynamic service-based policy includes an application normalized view of the device capability;
providing the dynamic service-based policy from the authentication system to the remotely served application, including the application normalized view of the device capability;
determining, at the application, one or more features to be delivered from the remotely served application to the user device as part of an application session based on the dynamic authentication context and the application normalized view of the device capability;
monitoring, at the authentication system, for a change in the dynamic authentication context, wherein the change in the dynamic authentication context includes a change in the device capability;
updating, at the authentication system, the dynamic service-based policy to generate an updated dynamic service-based policy; and
providing the updated dynamic service-based policy from the authentication system to the application without a request from the application for an updated dynamic service-based policy.

8. The nontransitory computer readable medium of claim 7, wherein the dynamic authentication context further includes a device type.

9. The nontransitory computer readable medium of claim 7, wherein the indication of a need for a service-based policy includes determining the application is requesting the service-based policy.

* * * * *